(12) United States Patent
Petrescu et al.

(10) Patent No.: US 8,983,148 B2
(45) Date of Patent: Mar. 17, 2015

(54) COLOR SEGMENTATION

(75) Inventors: Stefan Petrescu, Bucuresti (RO);
Mihnea Gangea, Bucuresti (RO);
Petronel Bigioi, Galway (IE); Alexei Pososin, Galway (IE); Alexandru Drimbarean, Galway (IE)

(73) Assignee: Fotonation Limited, Ballybrit, Galway (IE)

( * ) Notice: Subject to any disclaimer, the term of this patent is extended or adjusted under 35 U.S.C. 154(b) by 747 days.

(21) Appl. No.: 13/230,664

(22) Filed: Sep. 12, 2011

(65) Prior Publication Data

US 2012/0038787 A1    Feb. 16, 2012

Related U.S. Application Data

(63) Continuation of application No. 11/624,683, filed on Jan. 18, 2007, now Pat. No. 8,055,067.

(51) Int. Cl.
*G06K 9/00* (2006.01)

(52) U.S. Cl.
CPC .................................. *G06K 9/00234* (2013.01)
USPC ............................ 382/118; 382/164; 382/165

(58) Field of Classification Search
USPC .................................. 382/115–118, 162–165
See application file for complete search history.

(56) References Cited

U.S. PATENT DOCUMENTS

| | | |
|---|---|---|
| 4,456,354 A | 6/1984 | Mizokami |
| 4,690,536 A | 9/1987 | Nakai et al. |
| 5,130,935 A | 7/1992 | Takiguchi |
| 5,629,752 A | 5/1997 | Kinjo |
| 5,774,591 A | 6/1998 | Black et al. |
| 5,802,220 A | 9/1998 | Black et al. |
| 6,181,805 B1 | 1/2001 | Koike et al. |
| 6,275,614 B1 * | 8/2001 | Krishnamurthy et al. .... 382/224 |
| 6,393,136 B1 | 5/2002 | Amir et al. |
| 6,504,546 B1 | 1/2003 | Cosatto et al. |
| 6,661,907 B2 | 12/2003 | Ho et al. |
| 6,678,407 B1 | 1/2004 | Tajima |
| 6,816,156 B2 | 11/2004 | Sukeno et al. |
| 6,885,760 B2 | 4/2005 | Yamada et al. |
| 7,024,053 B2 | 4/2006 | Enomoto |
| 7,088,386 B2 | 8/2006 | Goto |
| 7,321,391 B2 | 1/2008 | Ishige |
| 7,352,393 B2 | 4/2008 | Sakamoto |
| 7,502,494 B2 | 3/2009 | Tafuku et al. |
| 7,551,211 B2 | 6/2009 | Taguchi et al. |

(Continued)

FOREIGN PATENT DOCUMENTS

| | | |
|---|---|---|
| EP | 1441497 A2 | 7/2004 |
| EP | 1453002 A2 | 9/2004 |

(Continued)

OTHER PUBLICATIONS

Co-pending U.S. Appl. No. 12/790,594, filed May 28, 2010.

(Continued)

*Primary Examiner* — Wesley Tucker
(74) *Attorney, Agent, or Firm* — Hickman Palermo Truong Becker Bingham Wong LLP

(57) ABSTRACT

A method of skin segmentation of a digital image is operable in an acquisition device. An image is acquired. A value indicative of a redness of a pixel of said image is compared with a face skin pixel redness criterion. The pixel is identified as a face skin pixel if said criterion is satisfied.

15 Claims, 3 Drawing Sheets

(56) References Cited

U.S. PATENT DOCUMENTS

| | | | |
|---|---|---|---|
| 7,612,794 | B2 | 11/2009 | He et al. |
| 7,620,214 | B2 | 11/2009 | Chen et al. |
| 7,623,733 | B2 | 11/2009 | Hirosawa |
| 7,636,485 | B2 | 12/2009 | Simon et al. |
| 7,652,693 | B2 | 1/2010 | Miyashita et al. |
| 7,733,388 | B2 | 6/2010 | Asaeda |
| 8,055,067 | B2 * | 11/2011 | Petrescu et al. ............... 382/164 |
| 2002/0081003 | A1 | 6/2002 | Sobol |
| 2003/0117501 | A1 | 6/2003 | Shirakawa |
| 2005/0036044 | A1 | 2/2005 | Funakura |
| 2005/0041121 | A1 | 2/2005 | Steinberg et al. |
| 2005/0140801 | A1 | 6/2005 | Prilutsky et al. |
| 2006/0204110 | A1 | 9/2006 | Steinberg et al. |
| 2006/0228037 | A1 | 10/2006 | Simon et al. |
| 2008/0025577 | A1 * | 1/2008 | Kugo et al. .................... 382/118 |
| 2009/0052750 | A1 | 2/2009 | Steinberg et al. |
| 2009/0175609 | A1 | 7/2009 | Tan |

FOREIGN PATENT DOCUMENTS

| | | |
|---|---|---|
| WO | WO 00/76398 A1 | 12/2000 |
| WO | WO 2007/128117 A1 | 11/2007 |

OTHER PUBLICATIONS

Co-pending U.S. Appl. No. 12/825,280, filed Jun. 28, 2010.
Co-pending U.S. Appl. No. 12/843,805, filed Jul. 26, 2010.
Final Office Action mailed Mar. 23, 2010, for U.S. Appl. No. 11/688,236, filed Mar. 19, 2007.
Final Office Action mailed Nov. 18, 2009, for U.S. Appl. No. 11/554,539, filed Oct. 30, 2006.
Machin, et al., "Real Time Facial Motion Analysis for Virtual Teleconferencing," IEEE, 1996, pp. 340-344.
Ming, et al., "Human Face Orientation Estimation Using Symmetry and Feature Points Analysis," IEEE, 2000, pp. 1419-1422.
Non-Final Office Action mailed Apr. 2, 2010, for U.S. Appl. No. 10/608,784, filed Jun. 26, 2003.
Non-Final Office Action mailed Apr. 30, 2010, for U.S. Appl. No. 11/765,899, filed Jun. 20, 2007.
Non-Final Office Action mailed Aug. 2, 2010, for U.S. Appl. No. 11/688,236, filed Mar. 19, 2007.
Non-Final Office Action mailed Aug. 19, 2009, for U.S. Appl. No. 11/773,815, filed Jul. 5, 2007.
Non-Final Office Action mailed Aug. 20, 2009, for U.S. Appl. No. 11/773,855, filed Jul. 5, 2007.
Non-Final Office Action mailed Jan. 20, 2010, for U.S. Appl. No. 12/262,024, filed Oct. 30, 2008.
Non-Final Office Action mailed Jun. 16, 2010, for U.S. Appl. No. 12/482,305, filed Jun. 10, 2009.
Non-Final Office Action mailed Jun. 22, 2010, for U.S. Appl. No. 12/055,958, filed Mar. 26, 2008.
Non-Final Office Action mailed Jun. 23, 2010, for U.S. Appl. No. 11/941,156, filed Nov. 18, 2007.
Non-Final Office Action mailed May 12, 2010, for U.S. Appl. No. 11/554,539, filed Oct. 30, 2007.
Non-Final Office Action mailed Sep. 8, 2009, for U.S. Appl. No. 11/688,236, filed Mar. 19, 2007.
Notice of Allowance mailed Aug. 23, 2010, for U.S. Appl. No. 12/262,024, filed Oct. 30, 2008.
Notice of Allowance mailed Jun. 10, 2010, for U.S. Appl. No. 12/262,024, filed Oct. 30, 2008.
Notice of Allowance mailed Sep. 28, 2009, for U.S. Appl. No. 12/262,037, filed Oct. 30, 2008.
PCT Notification of Transmittal of the International Search Report and the Written Opinion of the International Searching Authority, or the Declaration, for PCT Application No. PCT/EP2009/005461, dated Apr. 20, 2010, 12 pages.
Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet: URL: http://ilab.cs.ucsb.edu/publications/YaoMS.pdf.
U.S. Appl. No. 11/464,083, filed Aug. 11, 2006.

* cited by examiner

COLOR SEGMENTATION

PRIORITY

This application is a Continuation of U.S. patent application Ser. No. 11/624,683, filed Jan. 18, 2007, which is hereby incorporated by reference.

FIELD OF THE INVENTION

The present invention provides an improved method and apparatus for image processing. In particular the invention provides an improved method of color segmentation, for example face skin segmentation.

SUMMARY OF THE INVENTION

An improved method of face skin segmentation of a digital image is provided. A method of skin segmentation of a digital image is provided which is operable in an image acquisition device. An image is acquired. A value indicative of a redness of a pixel of the image is compared with a face skin pixel redness criterion. The pixel is identified as a face skin pixel if the criterion is satisfied.

The redness criterion may be proportional to the saturation of the pixel. The image may be in RGB colour space, and the value may include the R value of the pixel. The criterion may include R>G+K and R>B+K, and K may be a constant approximately equal to 15, and K may comprise approximately x * (pixel saturation+y), where x is in the range of approximately 0.53 to 0.6; and y is in the range of approximately 5 to 6.5. The pixel saturation may be calculated as: Sqrt($R^2$*0.27847−R*G*0.30610+$G^2$*0.28503−R*B * 0.25005+$B^2$*0.25661−G*B*0.26317). The criterion may further comprise an alternate condition that an intensity of said region, I, is greater than 240.

The image may be in YCC colour space, and the value may include a Cr value of said pixel. The criterion may include Cr>148.8162−0.1626*Cb+0.4726*K and Cr>1.2639*Cb−33.7803+0.133*K, where K may be a constant approximately equal to 15. The criterion may include Cr>148.8162−0.1626*Cb+0.2836*(pixel saturation+5) and Cr>1.2639*Cb−33.7803+0.4279*(pixel saturation+5), where pixel saturation is:

$$\sqrt{((Cr-128)^2+(Cb-128)^2)}$$

The criterion may include an alternate condition that an intensity of said region, Y, is greater than 240. The image may be partitioned into one or more regions of similar colors wherein said value indicative of a redness of a pixel may include an average pixel value for one of the regions.

The image may be partitioned into one or more regions of pixels having been identified as face skin pixels. The comparing may provide a real value. The method may include providing a contour map of a region comprising the real value. The contour map may be analyzed to locate one or more facial features within a region of face skin pixels. The image may be analyzed to determine one or more candidate face regions. Face detection may be performed on one or more regions of said image, each including a pixel having been identified as a face skin pixel and/or each including one of the regions of face skin pixels.

A computer program product and digital image processing device are further provided in accordance with the above methods.

BRIEF DESCRIPTION OF DRAWINGS

Embodiments of the invention will now be described, by way of example, with reference to the accompanying drawings, in which.

DESCRIPTION OF EMBODIMENTS

It is recognized herein that a primary difference exists between face skin regions and other skin regions in that face skin regions comprise a reddish skin tone. This information is utilized to create a uniquely advantageous color segmentation condition to identify face skin regions within an image.

Figure 1:
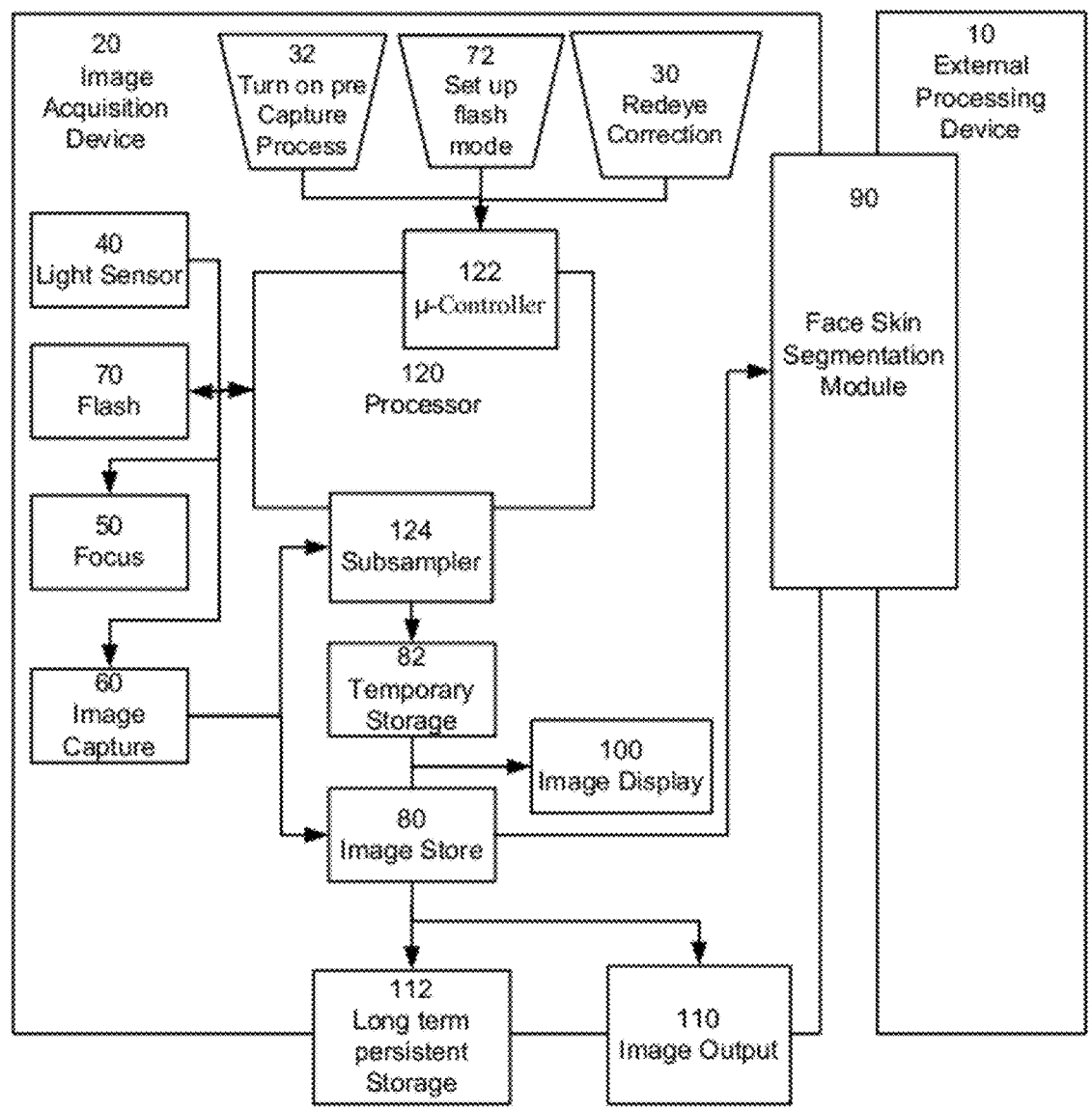
FIG. 1 is a block diagram of a digital camera operating in accordance with embodiments of the present invention.

FIG. 1 is a block diagram of an image acquisition device 20, which in the present embodiment is a portable digital camera, operating in accordance with embodiments of the present invention. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview images.

In the case of preview images which are generated in the pre-capture mode 32 with the shutter button half-pressed, the display 100 can assist the user in composing the image, as well as be used to determine focusing and exposure. Temporary storage 82 is used to store one or more of the preview images and can be part of the image store 80 or a separate component. The preview image is usually generated by the image capture device 60.

For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

A skin segmentation module 90 can be integral to the camera 20 or part of an external processing device 10 such as a desktop computer, a colour printer or a photo kiosk. In this embodiment, the skin segmentation module 90 receives the captured high resolution digital image from the store 80 and analyzes it to identify regions as face or non-face regions. The is performed according to the principles of the invention as described in the embodiments to follow and the results are made available for pre and/or post processing applications, such as face detection, or face tracking, or eye defect detection and/or correction algorithms. Furthermore, the identified face regions of the image may be either displayed on image display 100, saved on a persistent storage 112 which can be internal or a removable storage such as CF card, SD card or the like, or downloaded to another device via image output means 110 which can be tethered or wireless. The skin segmentation module 90 can be brought into operation either automatically each time an image is acquired, or upon user demand via input 30. Although illustrated as a separate item, where the module 90 is part of the camera it may be implemented by suitable software on the processor 120.

Figure 2:
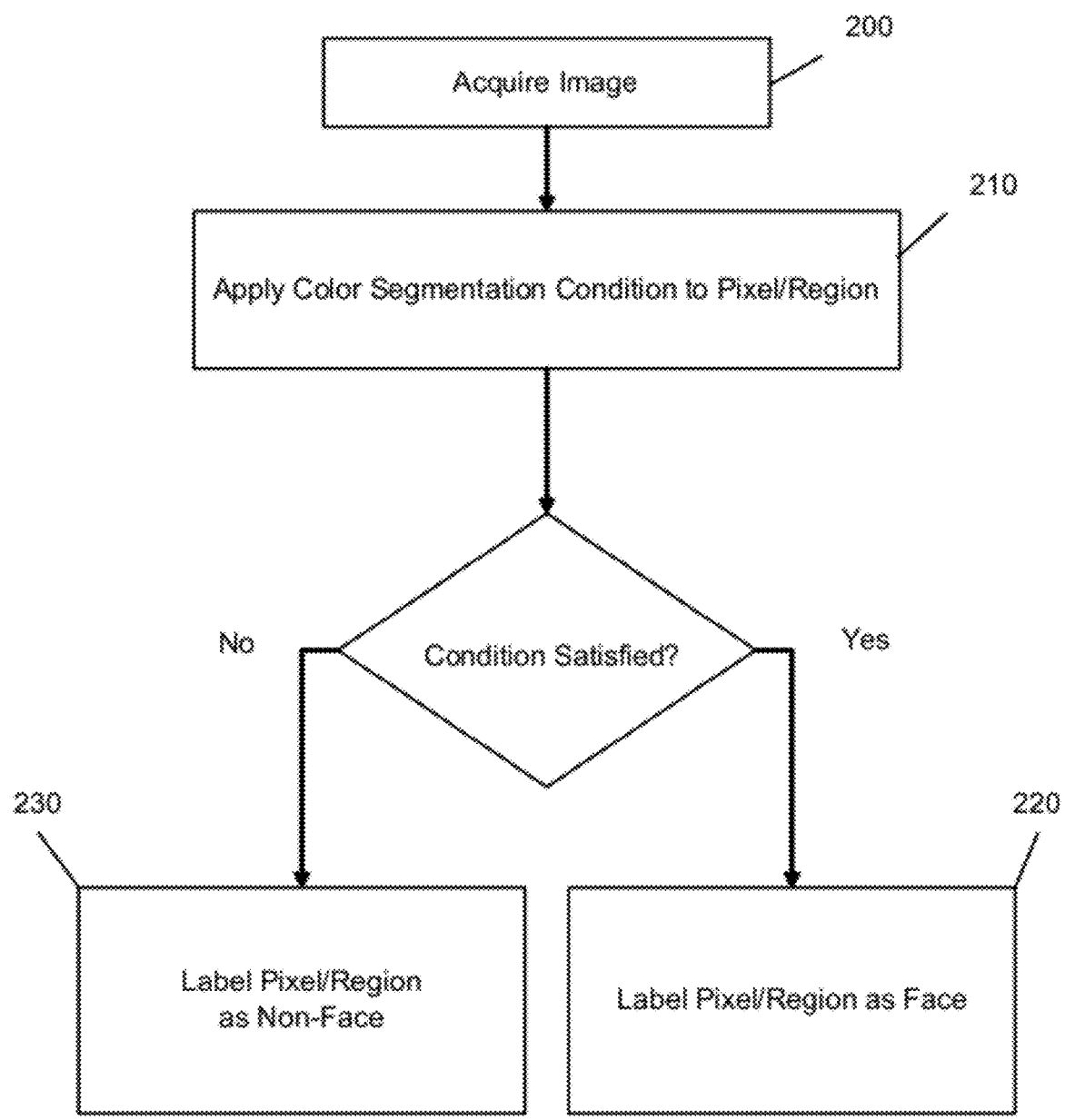
FIG. 2 is a flow diagram of a method according to a preferred embodiment of the invention.

Referring to FIG. 2 of the accompanying drawings, there is depicted a flow diagram illustrating an image processing method according a preferred embodiment of the present invention operable in the skin segmentation module 90 for distinguishing face regions from other regions within an image based on color segmentation.

An image is acquired, 200 from the store 80. In a first, second and third embodiment, a color segmentation condition is implemented as a Boolean function, which returns an indicator of whether or not the condition is satisfied. So for any input pixel, the color segmentation condition is applied to the pixel 210, and if the pixel satisfies the condition, the pixel is labeled as a face skin pixel 220, otherwise, the pixel is labeled as a non-face skin pixel 230. This function can be applied until all pixels have been labeled to produce a map of face and non-face skin pixels for the image.

Within the map, face skin regions can then be defined by linking pixels classified as comprising face skin. These regions can be bounded by rectangles which are then used to designate potential face regions.

In an alternative embodiment, the image may be partitioned initially into regions of similar colors to form a color map as disclosed in U.S. Pat. No. 6,661,907, incorporated by reference, or in any other suitable manner. In such an embodiment, the color segmentation condition is applied to a representative pixel color from each region to define the region as a face skin region or not.

In a first embodiment of the invention, where the image is in RGB color space, the color segmentation condition is represented as:

R>G+K and R>B+K

The corresponding color segmentation condition in YCC space is:

Cr>148.8162−0.1626*Cb+0.4726*K and
Cr>1.2639*Cb−33.7803+0.7133*K

In both RGB and YCC space, K is a constant and is approximately equal to 15.

In a second embodiment of the present invention, K is a function of saturation of a pixel or region and is defined as:

$K = x*(\text{pixel/region saturation}+y)$ where x is in the range of approximately 0.53 to 0.6; and
y is in the range of approximately 5 to 6.5

The difference between the red plane, R, and both the green, G and blue, B planes is directly proportional to the saturation level of the image. Thus the color segmentation condition in this embodiment varies dynamically with exposure.

In RGB space, the pixel/region saturation is the average of pixel saturation in a region and defined as:
Sqrt($R^2$*0.27847−R*G*0.30610+$G^2$*0.28503−R*B*0.25005+$B^2$*0.25661−G*B*0.26317)

In YCC space, the condition changes to:
Cr>148.8162−0.1626*Cb+0.2836*(pixel/region saturation+5) and
Cr>1.2639*Cb−33.7803+0.4279*(pixel/region saturation+5)

where pixel/region saturation is defined as:

$\sqrt{((Cr-128)^2+(Cb-128)^2)}$

In the third embodiment, the color segmentation condition is represented in RGB color space as:

R>G+K and R>B+K or
I>240
where I=0.3R+0.59G+0.11B

The corresponding color segmentation condition in YCC space is:

Cr>148.8162−0.1626*Cb+0.4726*K and
Cr>1.2639*Cb−33.7803+0.7133*K or
Y>240 where K is a constant or with corresponding changes where K is dependent on pixel/region saturation.

The additional condition that the intensity is greater than 240 is added to ensure that portions of the face that are overexposed are included in the resulting face-map, when, for example, chrominance information is destroyed and luminance levels are high.

Using this embodiment, "skin segmentation" is automatically adjusted as a function of the saturation of the image. For example if the image is very saturated (pixel/region saturation is large), the distance between the planes R&G and R&B will be large and so the formula which provides skin segmentation is R>G+K(big) and R>B+K(big). When saturation is very small, the color planes are very close, i.e. R≅G≅B, so the formula which provides skin segmentation is R>G+K(small) and R>B+K(small).

In a further embodiment of the present invention, the color segmentation condition is implemented as a real valued function, which returns a value indicative of an orthogonal distance of a pixel from the condition test plane(s). According to the basis of the present invention, i.e. that face regions comprise a reddish skin tone, the further the pixel from the test plane, the more face-like the pixel. Thus, pixels neighboring eye sockets, for example, are likely to be less red and therefore, have lower (possibly negative) orthogonal distance values. Correspondingly, pixels located around a cheek area of the face will have higher orthogonal distance values. In this way, a contour map of a face is produced.

Figure 3:
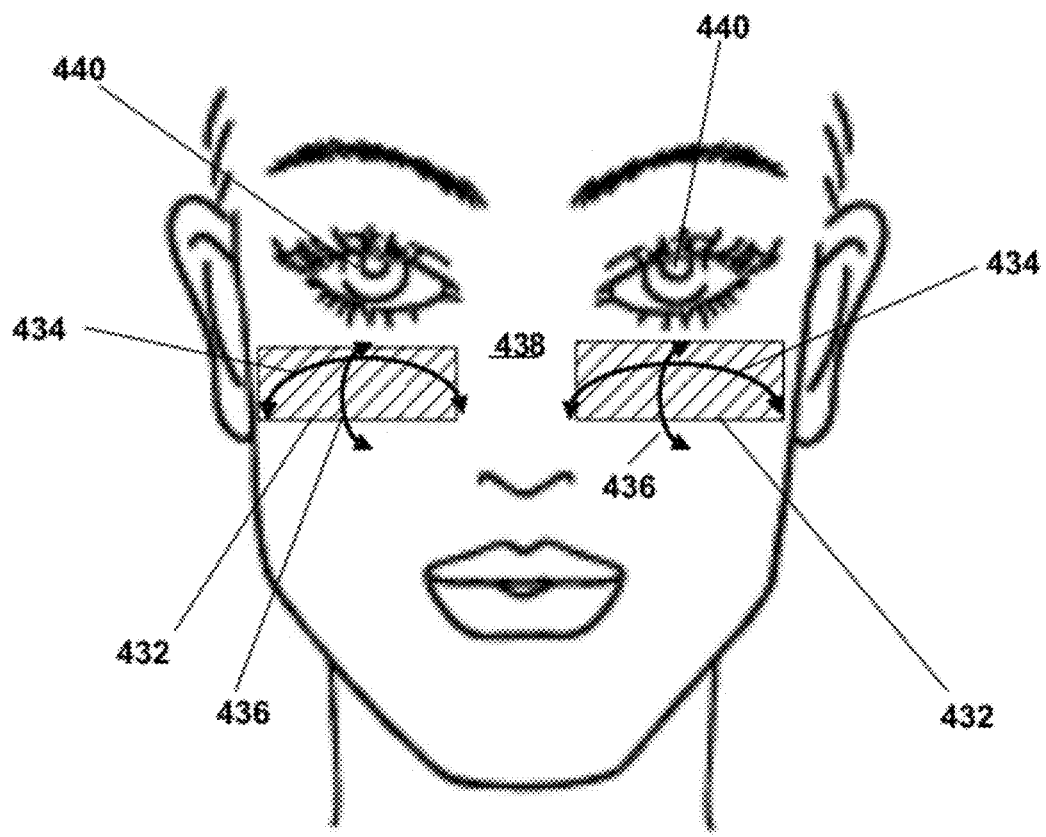
FIG. 3 shows a face including contours defined according to an embodiment of the present invention.

So referring to FIG. 3, for an image containing a face as outlined, using real valued skin segmentation, there should be produced two peaked regions 432 corresponding to cheeks within a face region of an image. Contours 434 in one direction can be used to locate a nose 438, whereas contours 436 in another direction can be used to indicate the location of eye sockets 440. Combinations of contours and other contour information from other face skin regions can be used to quickly direct a face feature detection algorithm to other face features such as eyebrows, mouth, chin etc.

All of the embodiments described above may be incorporated into or cooperate with further image processing techniques, such as face detection, face tracking, red-eye detection and correction and the like. For example, U.S. patent application Ser. No. 11/464,083, filed Aug. 11, 2006, which is hereby incorporated by reference, relates to an improved method of face tracking in a digital image (see also, US published applications nos. 2006/0204110 and U.S. application 60/821,165, as well as US published applications nos. 2005/0041121 and 2005/0140801, which are all incorporated by reference, wherein the latter two applications may be combined with the color segmentation described herein for identifying face skin pixels as distinguished from red eye pixels). The present invention can be used to quickly determine the location of potential face regions to enable the system of U.S. patent application Ser. No. 11/464,083 to limit the regions of an image to which more sophisticated face detection needs to be applied. Alternatively, the face contour technique described above can be used within face regions detected with the system of U.S. patent application Ser. No. 11/464,083 to more quickly identify and locate specific facial features for use in further processing, for example, to determine if the subject is blinking, smiling etc.

A method of color segmentation in a digital image to aid face detection may be combined with methods described above or claimed below in an alternative embodiment (see, e.g., U.S. Pat. No. 6,661,907, which is incorporated by reference). The method may involve partitioning the image into color regions by seeking connected groups of pixels of similar colors over a local region and representing each region by an average color value of that region in RGB color space to produce a color map. A chromatic characteristic of the average color value pixel for each region may be compared with a threshold and the regions may be identified as either skin or non-skin regions accordingly. The identified skin regions may then be further analyzed to detect face characteristics.

The invention is not limited to the embodiments described herein which may be modified or varied without departing from the scope of the invention, as set forth in the claims below, and structural and functional equivalents thereof. Also in methods described above and/or claimed below, the elements need not be performed only in the order recited.

The invention claimed is:

1. A method of a skin segmentation of a digital image, said method performed by an image acquisition device, comprising:
   acquiring an image using a lens and an image sensor of an image acquisition device;
   determining, using a processor, a face skin pixel redness value indicative of a redness of a pixel of said image, and identifying said pixel as a face skin pixel if said pixel of said image satisfies a criterion;
   wherein said pixel of said image is represented in a YCC colour space;
   wherein said face skin pixel redness value is a Cr value of said pixel represented in the YCC colour space;
   wherein said pixel of said image satisfies said criterion if:
   $Cr > k1 - k2*Cb$, and
   $Cr > k3*Cb - k4$, wherein k1, k2, k3, and k4 comprise constants.

2. The method of claim 1, wherein said criterion is further comprises satisfied if an intensity Y of said pixel is greater than 240.

3. The method of claim 1, further comprising partitioning said image into one or more regions of similar colors and wherein said face skin pixel redness value comprises an average pixel value for one of said one or more regions.

4. The method of claim 1, further comprising partitioning said image into one or more regions of pixels having been identified as face skin pixels.

5. The method of claim 1, wherein said determining provides a real value and wherein said method further comprises providing a contour map of a region comprising said real value.

6. A non-transitory, tangible computer program product comprising computer program code which when executed on a computing device is arranged to perform a method of a skin segmentation of an image, said method performed by an image acquisition device, wherein the method comprises:
   determining, using a processor, a face skin pixel redness value indicative of a redness of a pixel of an image acquired using a lens and an image sensor of an image acquisition device, and identifying said pixel as a face skin pixel if said pixel of said image satisfies a criterion;
   wherein said pixel of said image is represented in a YCC colour space;
   wherein said face skin pixel redness value is a Cr value of said pixel represented in the YCC colour space;
   wherein said pixel of said image satisfies said criterion if:
   $Cr > k1 - k2*Cb$, and
   $Cr > k3*Cb - k4$, wherein k1, k2, k3, and k4 comprise constants.

7. The non-transitory, tangible computer program product of claim 6, wherein said criterion is further satisfied if an intensity Y of said pixel is greater than 240.

8. The non-transitory, tangible computer program product of claim 6, wherein the computer program code further comprises instructions for partitioning said image into one or more regions of similar colors, and wherein said face skin pixel redness value comprises an average pixel value for one of said one or more regions.

9. The non-transitory, tangible computer program product of claim 6, wherein the computer program code further comprises instructions for partitioning said image into one or more regions of pixels having been identified as face skin pixels.

10. The non-transitory, tangible computer program product of claim 6, wherein the computer program code further comprises instructions for providing a contour map of a region comprising a real value.

11. A digital image acquisition and processing device comprising: a lens;
an image sensor;
a controller; and
a memory having code embedded therein for programming the controller to perform a method of a skin segmentation of an image, wherein the method comprises:
   determining, using the controller, a face skin pixel redness value indicative of a redness of a pixel of the image acquired using the lens and the image sensor, and identifying said pixel as a face skin pixel if said pixel of said image satisfies a criterion;
   wherein said pixel of said image is in a YCC colour space;
   wherein said face skin pixel redness value is a Cr value of said pixel represented in the YCC colour space;
   wherein said pixel of said image satisfies said criterion if:
   $Cr > k1 - k2*Cb$, and
   $Cr > k3*Cb - k4$, wherein k1, k2, k3, and k4 comprise constants.

12. The device of claim 11, wherein said criterion is further satisfied if an intensity Y of said pixel is greater than 240.

13. The device of claim 11, wherein the controller is further configured to perform: partitioning said image into one or more regions of similar colors and wherein said face skin pixel redness value comprises an average pixel value for one of said one or more regions.

14. The device of claim 11, wherein the controller is further configured to perform: partitioning said image into one or more regions of pixels having been identified as face skin pixels.

15. The device of claim 11, wherein said controller is further configured to perform: providing a contour map of a region comprising a real value.

* * * * *